(12) United States Patent
Seetharaman et al.

(10) Patent No.: US 9,705,933 B2
(45) Date of Patent: Jul. 11, 2017

(54) SYSTEM AND METHOD OF PERFORMING EFFECTIVE LI FOR COMMUNICATION INVOLVING ADULTERATED CONTENT

(71) Applicant: Wipro Limited, Bangalore (IN)

(72) Inventors: Swaminathan Seetharaman, Chennai (IN); Venkata Subramanian Jayaraman, Chennai (IN)

(73) Assignee: Wipro Limited, Bangalore (IN)

( * ) Notice: Subject to any disclaimer, the term of this patent is extended or adjusted under 35 U.S.C. 154(b) by 126 days.

(21) Appl. No.: 14/943,799

(22) Filed: Nov. 17, 2015

(65) Prior Publication Data
US 2017/0093927 A1  Mar. 30, 2017

(30) Foreign Application Priority Data
Sep. 30, 2015 (IN) .......................... 5233/CHE/2015

(51) Int. Cl.
H04L 29/06 (2006.01)
H04L 12/26 (2006.01)
H04L 12/703 (2013.01)

(52) U.S. Cl.
CPC .......... *H04L 63/30* (2013.01); *H04L 43/0823* (2013.01); *H04L 45/28* (2013.01)

(58) Field of Classification Search
CPC ...... H04L 63/30; H04L 43/0823; H04L 45/28
See application file for complete search history.

(56) References Cited

U.S. PATENT DOCUMENTS

| 2010/0199189 A1* | 8/2010 | Ben-Aroya | ....... G06F 17/30516 715/736 |
| 2011/0154181 A1* | 6/2011 | Kawa | ...................... H04L 63/00 715/234 |
| 2012/0096145 A1* | 4/2012 | Le | ........................ G06Q 50/265 709/224 |
| 2012/0254403 A1* | 10/2012 | Imbimbo | .............. H04W 12/02 709/224 |

OTHER PUBLICATIONS

Polčák, L., et al., "Hiding TCP Traffic: Threats and Countermeasures", Security and Protection of Information, 2013, Faculty of Information Technology, Brno University of Technology, pp. 83-96.
Cronin, E., et al., "On the (un) Reliability of Eavesdropping", 200x Inderscience Enterprises Ltd., Oct. 17, 2007, Department of Computer and Information Science, University of Pennsylvania, pp. 1-12.

* cited by examiner

*Primary Examiner* — Duc C Ho
(74) *Attorney, Agent, or Firm* — LeClairRyan, a Professional Corporation (57) ABSTRACT

This technology relates generally to lawful interception and more particularly to methods and systems for lawful interception. In one embodiment, a method for lawful interception in a communication network is disclosed. The method includes detecting in real-time, via at least one network device, adulteration in communication data based on comparison of a set of adulteration parameters derived from the communication data with associated thresholds within a set of thresholds. The method further includes analyzing, via the at least one network device, adulterated content in the communication data to determine feasibility of correcting the adulterated content based on satisfaction of predefined criteria. Moreover, the method includes correcting, selectively, the adulterated content based on satisfaction of the predefined criteria.

21 Claims, 9 Drawing Sheets

SYSTEM AND METHOD OF PERFORMING EFFECTIVE LI FOR COMMUNICATION INVOLVING ADULTERATED CONTENT

This application claims the benefit of Indian Patent Application Serial No. 5233/CHE/2015 filed Sep. 30, 2015, which is hereby incorporated by reference in its entirety.

TECHNICAL FIELD

This technology relates generally to lawful interception and more particularly to methods and systems for performing lawful interception in communication networks.

BACKGROUND

In a multi-user communication scenario that includes one or more Lawful Interception (LI) target users, one or more of these users may manipulate media content in order to mislead a Law Enforcement Agency (LEA). The manipulation may be achieved by adulterating traffic generated from his/her system. The adulteration is done such that only the intended recipient of the communication receives unadulterated content and the LEA receives adulterated content. This may be enabled as intermediate systems may interpret the adulterated communication content as unadulterated content or the adulterated content may be forwarded to the LEA without understanding that it is garbage. As a result, LI content is corrupted beyond interpretation by the LEA.

In conventional methods, adulterated packets are detected based on an offline analysis. The offline analysis may include analysis of histogram of the hop length of packets and thereafter determining minimum hop length for packets to reach the receiver. The offline analysis further includes analysis of average bytes per packet, and comparison with standard communication flows to determine possibility of an attack. Based on this analysis, the adulterated packets are removed thereafter. However, this method supports only Transmission Control Protocol (TCP) and is not suitable for online real-time detection of adulterated packets.

In other conventional methods, sensitivity of a network node that performs functionality of Content Duplication Function (CDF) is enhanced, such that, the network node collects all information that may help in detection of adulterated packets. The network node may also send out some probe packets to learn more about the network. Additionally, the network node may be placed as close as possible to the receiver. However, these conventional methods fail to address detection of adulterated packets (which have been adulterated at the network or higher layer) in a manner that complies with legal and regulatory requirements, irrespective of the CDF location, and without employing any probe packets to learn about the network.

SUMMARY

In one embodiment, method for lawful interception in a communication network is disclosed. The method includes detecting in real-time, via at least one network device, adulteration in communication data based on comparison of a set of adulteration parameters derived from the communication data with associated thresholds within a set of thresholds; analyzing, via the at least one network device, adulterated content in the communication data to determine feasibility of correcting the adulterated content based on satisfaction of predefined criteria; and correcting, selectively, the adulterated content based on satisfaction of the predefined criteria.

In another embodiment, a system for lawful interception in a communication network is disclosed. The system includes at least one processor and a computer-readable medium. The computer-readable medium stores instructions that, when executed by the at least one processor, cause the at least one processor to perform operations that include detecting in real-time, via at least one network device, adulteration in communication data based on comparison of a set of adulteration parameters derived from the communication data with associated thresholds within a set of thresholds; analyzing, via the at least one network device, adulterated content in the communication data to determine feasibility of correcting the adulterated content based on satisfaction of predefined criteria; and correcting, selectively, the adulterated content based on satisfaction of the predefined criteria.

In yet another embodiment, a non-transitory computer-readable storage medium for rationalizing a portfolio of assets is disclosed, which when executed by a computing device, cause the computing device to: detect in real-time, via at least one network device, adulteration in communication data based on comparison of a set of adulteration parameters derived from the communication data with associated thresholds within a set of thresholds; analyze, via the at least one network device, adulterated content in the communication data to determine feasibility of correcting the adulterated content based on satisfaction of predefined criteria; and correct, selectively, the adulterated content based on satisfaction of the predefined criteria.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
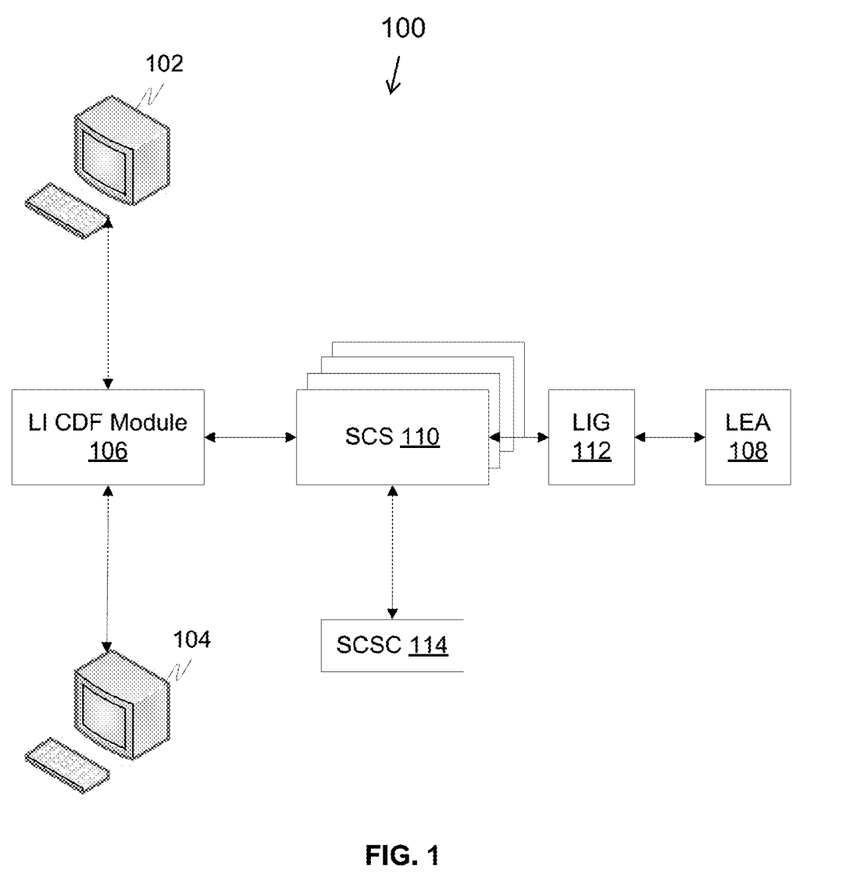
FIG. 1 illustrates an environment (that is exemplary) in which various embodiments may function.

Additional illustrative embodiments are listed below. In one embodiment, an environment 100 (that is exemplary) in which various embodiments may function is illustrated in FIG. 1. Environment 100 includes a target user 102 who initiates a communication session with a peer user 104. Target user 102 is identified for lawful interception, as a result, each communication session that involves target use 102 as a sender or a recipient is routed through a Lawful Interception (LI) Content Duplication Function (CDF) module 106. LICDF module 106 intercepts all communication sessions involving target user 102. The functionality of LICDF module 106 may be built in a network device or node within a network of target user 102. The network device or node is configured to perform data duplication. Examples of these network devices or nodes may include, but are not limited to Routers, Switches, Gateways, Bridges, Modems, HUB, and Multistation Access Unit (MAU). LICDF module 106 creates a copy of the contents of each communication session and sends these copies to a Law Enforcement Agency (LEA) 108 through a Session Continuity Server (SCS) 110 and an LI Gateway (LIG) 112.

An SCS controller (SCSC) 114 selects a network device or node that performs functionality of LICDF module 106 based on one or more of pre-provisioning by the operator, dynamic network conditions, and session characteristics. Accordingly, the selected network device or node initiates LI and acts as LICDF module 106. Thereafter, LICDF module 106 starts sending copies of data packets in a communication session between target user 102 and peer user 104 to SCS 110. During the communication session, at least one of target user 102 or peer user 104 may adulterate the communication content using various adulteration methods. Examples of such methods may include, but are not limited to sending fake data packets for which Time-To-Live (TTL) value is kept sufficiently small so that these fake data packets are dropped before reaching the designated user. The adulterated content is also sent along with the non-adulterated content in the communication session to SCS 110 by LICDF module 106.

Thereafter, SCS 110 performs suitable formatting and sequencing on data packets received from LICDF module 106 and sends these data packets to LIG 112. LIG 112 further sends these data packets exchanged between target user 102 and peer user 104 along with adulterated packets to LEA 108. Thus, data packets received by LEA 108 may not represent the actual conversation between target user 102 and peer user 104.

Figure 2:
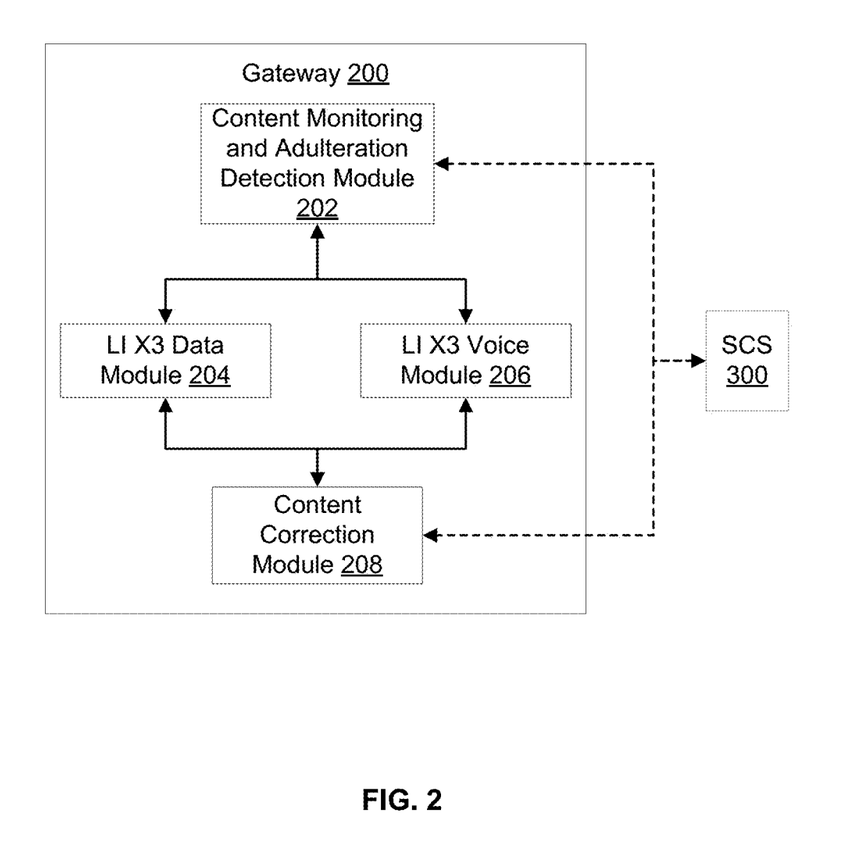
FIG. 2 is a block diagram illustrating various modules within a gateway that performs that performs Lawful Interception (LI) content duplication functionality, in accordance with an embodiment.

Referring now to FIG. 2, a block diagram of various modules within a gateway 200 that performs LI content duplication functionality is illustrated, in accordance with an embodiment. In addition to performing functionality of LICDF module 106, gateway 200 includes a Content Monitoring and Adulteration Detection (CMAD) module 202, an LI X3 data module 204, an LI X3 voice module 206, and a Content Correction (CC) module 208. FIG. 2 also shows an SCS 300 that communicates with gateway 200 and is analogous to SCS 110 shown in FIG. 1.

CMAD module 202 obtains relevant information from SCS 300 in order to monitor communication data exchanged between target user 102 and peer user 104 and to detect potential adulteration in real-time. The relevant information received from SCS 300 includes a set of thresholds associated with adulteration parameters. Additionally, the relevant information may include network topology related information, which is relevant to a session (for example, minimum number of hops between target user 102 and peer user 104 for the session); specific content-adulteration mechanisms (for example, IP hop length manipulation and filling certain unused protocol headers) to monitor based on provisioned or historical data of sessions involving target user 102 and/or peer user 104; and session-type specific monitoring inputs (for example, examining RTP headers in case of voice sessions, monitoring the interval of retransmission of same packet, and whether the retransmitted packet has different contents in case of TCP, use of unacceptable header values in case of UDP, and minimum content length of each packet).

To detect adulteration, CMAD module 202 receives from SCS 300 a set of adulteration parameters derived from the communication data by SCS 300 and compares the values of the set of adulteration parameters with associated thresholds within the set of thresholds. The set of thresholds are also received by CMAD module 202 from SCS 300. The set of adulteration parameters may include, but are not limited to packets with insufficient hop length, packets with unused protocol headers filled in, packets with invalid, not used, or intentionally misleading Real-time Transport Protocol (RTP) header contents (for example, an old time stamp), interval between retransmission of the same packet, packets with difference in content between the initially sent and retransmitted version(s) of the same packet, packets with unacceptable protocol or packet header values, port changes, RST and other flag adulterations, packets with insufficient or invalid TTL contents, and packets with content length lower than the minimum possible content length for that packet type or protocol.

CMAD module 202 may also dynamically adapt each threshold in the set based on a set of network parameters that it monitors in real time. These set of network parameters may include, but are not limited to network congestion, link unavailability, network choke, packet queuing, buffer overflows, insufficient network coverage, network delays, packet drops, and users involved in session for the communication data. Based on a result of comparison of the set of adulteration parameter values with associated thresholds, whether adapted dynamically or not, CMAD module 202 determines adulteration in communication data exchanged between target user 102 and peer user 104. This is further explained in detail in conjunction with FIGS. 5 and 6.

To enable CMAD module 202 to perform the above computations, CMAD module 202 may communicate with LI X3 data module 204 for data sessions and LI X3 voice module 206 for voice sessions to receive information that may include one or more of timestamps of TCP packets and their acknowledgements to determine Round Trip Time (RTT), instances of retransmission of TCP packets by the source in quick succession or before re-transmission timer expiry, duplicate-acknowledgement reception for TCP packet, TCP packets being retransmitted with different contents each time; abnormal values in packet headers in protocols at the network layer (for example, IP), transport layer (for example, TCP, UDP, SCTP) or higher layers (for example, application layer protocols, like RTSP); trend of minimum hop length/TTL of TCP/SCTP packets below which the packets are dropped en route (i.e., before the packets reach the intended recipient) within a data stream.

After identifying adulteration, CMAD module 202 instructs each of LI X3 data module 204 and LI X3 voice module 206 to forward the identified adulteration information along with the communication data to CC module 208. Thereafter, CC module 208 analyzes adulterated content in the communication data to determine whether it is feasible to correct the adulterated content based on satisfaction of predefined criteria. The predefined criteria include meeting a confidence level of accuracy in correcting the adulterated content in the communication data. CC module 208, selectively corrects the adulterated content based on which confidence range the confidence level falls in. This is further explained in detail in conjunction with FIGS. 7A and 7B.

After selectively correcting the adulterated content, CC module 208 sends the communication data back to LI X3 data module 204 for data sessions and to LI X3 voice module 206 for voice sessions. Thereafter, LI X3 data module 204 and LI X3 module 206 forward communicated data to the SSC. In an embodiment, CMAD module 202 may directly forward identified adulteration information along with the communication data to SCS 300. SCS 300 is further explained in detail in conjunction with FIG. 3.

Figure 3:
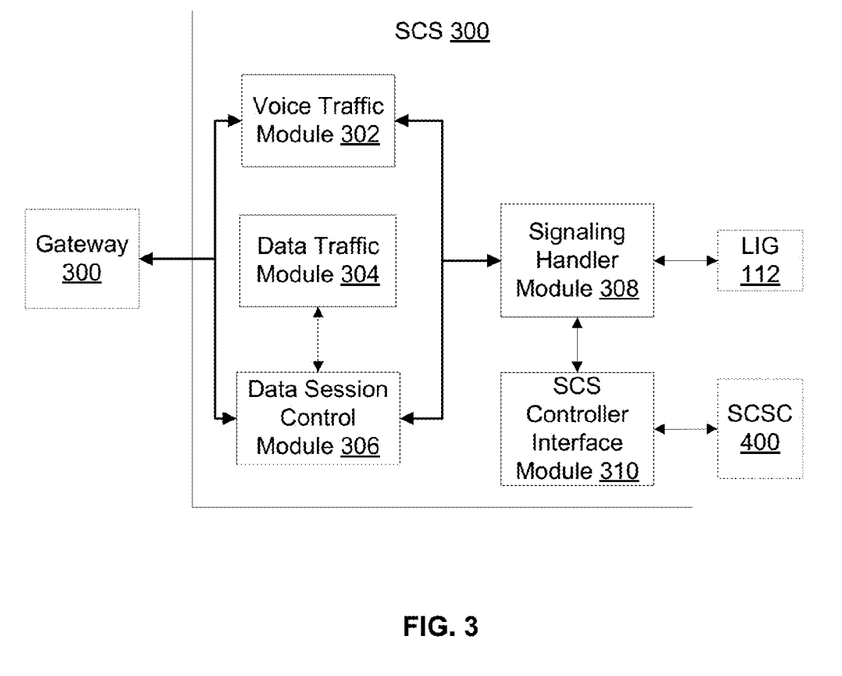
FIG. 3 is a block diagram illustrating various modules of a session continuity server, in accordance with an embodiment.

Referring now to FIG. 3, a block diagram of various modules of an SCS 300 is illustrated, in accordance with an embodiment. SCS 300 receives adulteration information along with the communication data from gateway 200. SCS 300 includes a voice traffic module 302, a data traffic module 304, a data session control module 306, a signaling handler module 308, and an SCSC interface module 310.

For voice sessions, voice traffic module 302 receives information regarding the set of thresholds associated with adulteration parameters from an SCSC 400. Additionally, the information may include network topology related information, which is relevant to a session (for example, minimum number of hops between target user 102 and peer user 104 for the session); specific content-adulteration mechanisms (for example, IP hop length manipulation and filling certain unused protocol headers) to monitor based on provisioned or historical data of sessions involving target user 102 and/or peer user 104; and session-type specific monitoring inputs (for example, examining RTP headers in case of voice sessions, monitoring the interval of retransmission of same packet, and whether the retransmitted packet has different contents in case of TCP, use of unacceptable header values in case of UDP, and minimum content length of each packet).

In addition to forwarding this information to gateway 200, voice traffic module 302 performs functionality of CMAD module 202 and CC module 208 to detect adulteration and thereafter correct the adulteration during the period of gateway handover. This may be required when target user 102 is not stationary or when a gateway handover occurs due to adverse network conditions. For example, target user 102 may be using a mobile phone to communicate with peer user 104 and may be constantly moving, and hence may involve a gateway handover. By way of another example, the network conditions in the network segment of gateway 200 may become adverse (for example, due to increased congestion levels), thereby necessitating a gateway handover to ensure LI continuity. Additionally, voice traffic module 302 sends data received from gateway 200 before the handover and data associated with adulteration detection and correction performed by voice traffic module 302 to the new gateway that will perform lawful interception for target user 102 in future.

For data sessions, data traffic module 304 and data session control module 306 in combination performs same functionalities as are performed by voice traffic module 302 for voice sessions. Data traffic module 304 detects and corrects adulteration during gateway handover. Thereafter, data session control module 306 sends data received from gateway 200 before the handover and data associated with adulteration detection and correction performed by data traffic module 304 to the new gateway.

Thereafter, the information associated with detection and subsequent correction of the adulteration in communication data is forwarded to LIG 112 by signaling handler module 308 via the X2 interface between SCS 300 and LIG 112. Exchange of information between SCSC 400 and various modules in SCS 300 is managed by SCS controller interface module 310. Various modules of the SCSC and their functionalities are explained in detail in conjunction with FIG. 4.

Figure 4:
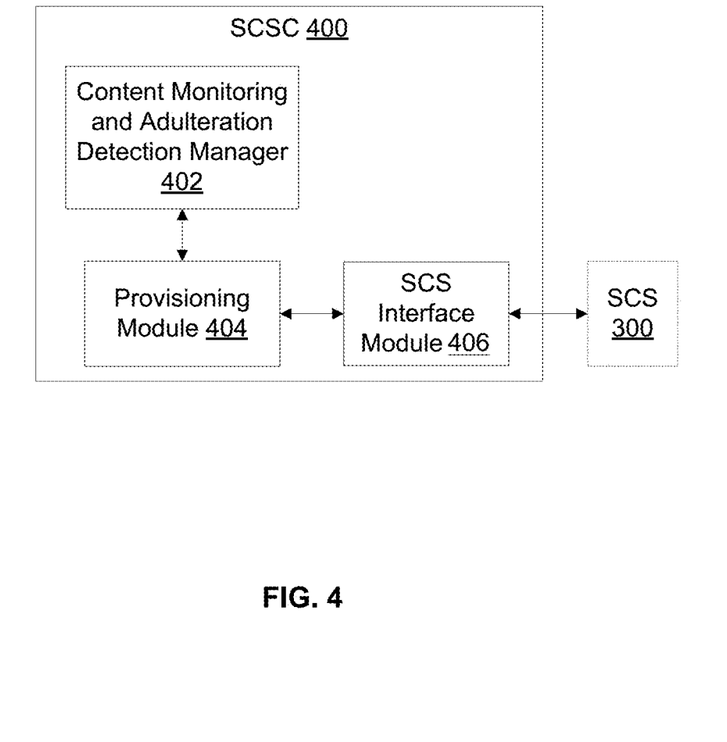
FIG. 4 is a block diagram illustrating various modules of a session continuity server controller for the session continuity server, in accordance with an embodiment.

Referring now to FIG. 4, a block diagram of various modules of an SCS Controller (SCSC) 400 is illustrated, in accordance with an embodiment. SCSC 400 performs the functionality of selecting gateway 200 and SCS 300 for performing their respective functions. SCSC 400 includes a Content Monitoring and Adulteration Detection Manager (CMADM) 402, a provisioning module 404, and an SCS interface module 406.

CMADM 402 determines the set of adulteration parameters and computes the associated set of thresholds based on network topology and the selected gateway 200 and SCS 300. Thereafter, CMADM 402 sends information for the set of thresholds to SCS 300, which forwards this information to gateway 200. This enables SCS 300 and gateway 200 to identify adulteration in the communication data. CMADM 402 sends additional information to SCS 300, which may include network topology related information, which is relevant to a session (for example, minimum number of hops between target user 102 and peer user 104 for the session); specific content-adulteration mechanisms (for example, IP hop length manipulation and filling certain unused protocol headers) to monitor based on provisioned or historical data of sessions involving target user 102 and/or peer user 104; and session-type specific monitoring inputs (for example, examining RTP headers in case of voice sessions, monitoring the interval of retransmission of same packet, and whether the retransmitted packet has different contents in case of TCP, use of unacceptable header values in case of UDP, and minimum content length of each packet). The relevant information sent by CMADM 402 to SCS 300 as described above is, in turn, forwarded to gateway 200.

In an embodiment, CMADM 402 may perform these computations at start of a session, each time a new gateway is selected or when there is change in the session characteristics. The session characteristics may include, but are not limited to a new user being added to the session and one of the users being handed over to another network.

CMADM 402 also adapts each of the set of thresholds based on updates received from gateway 200 and/or SCS 300. These adaptations made by CMADM 402 are used in future by each of gateway 200 and SCS 300 to identify and correct adulterations detected in communication data exchanged between target user 102 and peer user 104. In other words, historical data of sessions that involve target user 102 is utilized for more accurate monitoring and detection of adulteration.

Provisioning module 404 receives all provisioned inputs relevant to monitoring of the communication data and subsequent detection of adulteration in the communication data that involves target user 102. Additionally, provisioning module 404 receives all provisioned inputs relevant to a possible correction of detected adulteration in the communication data. These provisioned inputs may include, but are not limited to specific events related to target user 102, the set of thresholds, and the set of network parameters. These inputs are then communicated to CMADM 402.

The communication between SCS 300 and various modules in SCSC 400 is enabled by SCS interface module 406, which directly communicates with SCS controller interface module 310.

Figure 5:
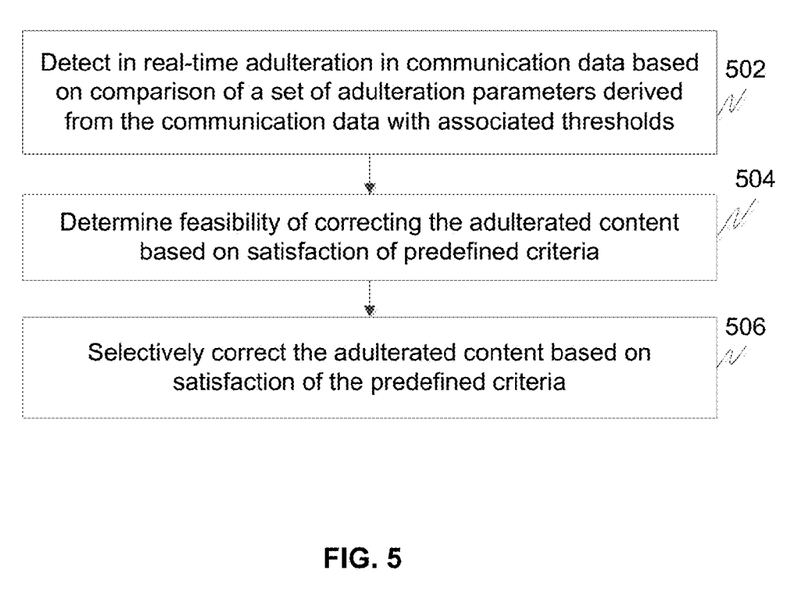
FIG. 5 illustrates a flow chart of a method for performing lawful interception in a communication network, in accordance with an embodiment.

Referring to FIG. 5, a flow chart of a method for performing lawful interception in a communication network is illustrated, in accordance with an embodiment. When communication session is set up between target user 102 and peer user 104, a lawful interception is initiated for target user 102 by selecting a network device. The network device may be at least one of gateway 200 and SCS 300 that are selected by SCSC 400. Thereafter, at 502, the network device detects adulteration in the communication data in real time as the communication data is being exchanged. The adulteration is detected by comparing dynamically the values of a set of adulteration parameters derived from the communication data with associated thresholds within a set of thresholds. The set of thresholds are also received by CMAD module 202 from SCS 300. The set of adulteration parameters may include, but are not limited to packets with insufficient hop length, packets with unused protocol headers filled in, packets with invalid, not used, or intentionally misleading Real-time Transport Protocol (RTP) header contents (for example, an old time stamp), interval between retransmission of the same packet, packets with difference in content between the initially sent and retransmitted version(s) of the same packet, packets with unacceptable protocol or packet header values, port changes, RST and other flag adulterations, packets with insufficient or invalid TTL contents, and packets with content length lower than the minimum possible content length for that packet type or protocol.

The set of adulteration parameter values may be computed in gateway 200 at fixed intervals or upon occurrence of an event, such as, onset or abatement of congestion. For example, the RTT value may be computed by examining the timestamps of TCP packets and their acknowledgements in real-time. The set of thresholds may also be computed by gateway 200. Alternatively, SCSC 400 may compute the set of thresholds based on session characteristics and users involved in the session. For example, during handover of the user to a different network or handover of the gateway, the hop length threshold may be computed based on the network topology and users involved in the session. In an embodiment, the set of thresholds may be dynamically adapted based on a set of network parameters and comparison of the set of adulteration parameters with associated dynamically adapted thresholds may be performed thereafter. This is further explained in conjunction with FIG. 6.

Based on the comparison, when observed values of one or more adulteration parameters cross associated thresholds, gateway 200 stores the result of this comparison and forwards the same to SCS 300. The result of such comparison may include, but are not limited to threshold(s) that were crossed, and values of adulteration parameters that did not cross associated thresholds; number and content of TCP packets which were below the hop length threshold but did not involve a retransmission, number and content of packets which contained abnormal header contents but did not involve a retransmission, number; and content of TCP packets which were above the hop length threshold by a certain number (for example, up to 3), but involved retransmission with different contents each time.

Thereafter, based on adulteration parameters that have crossed associated thresholds, gateway 200 determines whether content adulteration has occurred or not. For example, such a determination could be based on the number of packets retransmitted with different contents (in case of TCP/SCTP) crossing an associated threshold; number of packets which contained abnormal headers and their frequency of occurrence, and correlation of these with the percentage of such packets that were retransmitted in spite of good network conditions.

Thereafter, at 504, the network device, analyzes adulterated content in the communication data in order to determine whether it would be feasible to correct the adulterated content based on satisfaction of predefined criteria. The predefined criteria include meeting a confidence level of accuracy in correcting the adulterated content. In other words, the adulterated content is corrected only when the corrections made would be reasonably accurate. However, if the corrections made to the adulterated content would not be reasonably accurate the adulterated content may not be corrected.

The information stored for content adulteration is used by gateway 200 to perform content correction. This information may include, but is not limited to all adulterated packets, information regarding abnormalities in these packets (for example, abnormal header contents and fast retransmissions with different contents each time), number and content of TCP packets which were below the hop length threshold but did not involve a retransmission, and number and content of packets which contained abnormal header contents but did not involve a retransmission.

Using this information, gateway 200 determines whether it is possible to correct the adulteration by performing some assessments for different scenarios. In an exemplary embodiment, in case of number of TCP/SCTP packets having hop length lower than the hop length threshold crossing the number threshold, and contents of retransmitted packets being different from the earlier (re)transmission(s), gateway 200 performs assessments that may include, but are not limited to analysis of the timestamps of retransmissions and acknowledgement received to match the packet and its retransmission, taking into account also RTT value; and analysis of the difference in contents of packets to look for abnormal header values. Further, in case of number of abnormal TCP/SCTP packets which contained abnormal header contents crossing the threshold, and contents of the retransmitted packets being different from the earlier (re) transmission(s), gateway 200 performs assessments that may include, but are not limited to analysis of the contents of these packets and matching the acknowledgement timestamps. Additionally, in case of number of abnormal UDP/RTP packets with abnormal contents crossing the threshold, gateway 200 examines the contents of such packets.

Thereafter, at 506, the adulterated content is selectively corrected based on satisfaction of the predefined criteria. In an embodiment, based on the assessment made above, gateway 200 determines whether it is possible to correct at least some of the packets. If gateway 200 determines that it is possible to correct one or more packets with a minimum confidence level, it further proceeds to correct the adulterated content. The minimum confidence level may be provisioned by LEA 108. In case gateway 200 determines that it is not possible to correct the adulteration, it sends information that may include, but is not limited to confidence level and inability to identify exact adulterated packet to SCS 300. Correction of adulterated content is further explained in detail in conjunction with FIGS. 7A and 7B.

Figure 6:
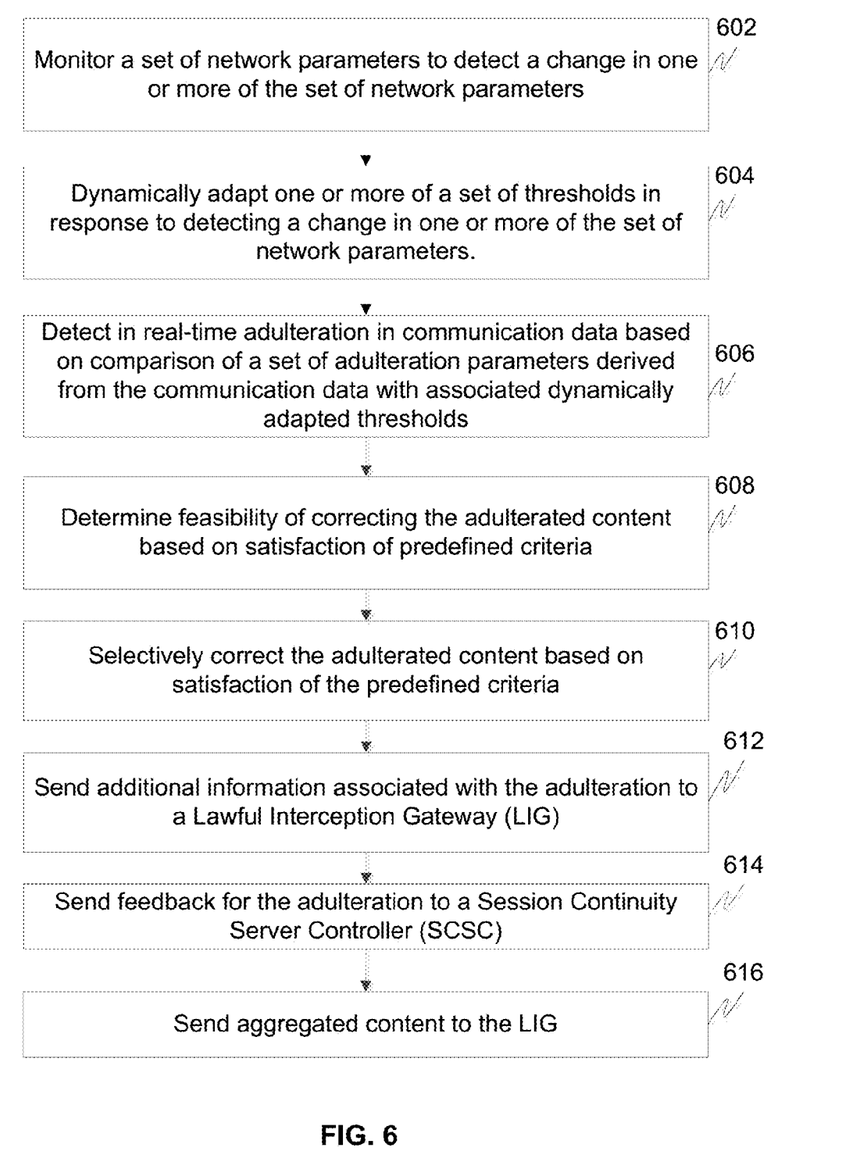
FIG. 6 illustrates a flow chart of a method for performing lawful interception in a communication network, in accordance with another embodiment.

Referring now to FIG. 6, a flow chart of a method for performing lawful interception in a communication network is illustrated, in accordance with another embodiment. At 602, a set of network parameters are monitored in order to detect a change in one or more of the set of network parameters. The set of network parameters may include, but are not limited to network congestion, network choke, packet queuing, buffer overflows, insufficient network coverage, link unavailability, network delays, packet drops, and users involved in session for the communication data.

Thereafter, in response to detecting a change in one or more of the set of network parameters, one or more of the set of thresholds are dynamically adapted at 604. The dynamic adaptation of thresholds is performed by gateway 200 at fixed intervals of time and/or on occurrence of an event, for example, high network congestion. In an exemplary embodiment, threshold for hop length may be adapted using the equation 1 given below:

$$\text{Hop\_length\_threshold} = \text{Input\_hop\_length\_thr} * \text{Alpha} * \text{Beta} \quad (1)$$

where,

Hop_length_threshold = dynamically adapted threshold;

Input_hop_length_thr =
 value of the hop length threshold computed and provided by
  SCSC 400 taking into consideration the network topology;

Alpha = 1, if network congestion level <= 50%
 = 0.9, if the network congestion level is > 50 and <= 75%
 = 0.8, if the network congestion level is > 75%;

Beta = 1, if the session did not involve roaming and home routing,
 = 0.9, if the session involves roaming across access network
  and home routing,
 = 0.7, if the session involves roaming across networks and
  home routing.

In another exemplary embodiment, threshold for number of packet retransmitted, may be adapted using the equation 2 given below:

$$\text{Number\_of\_packets\_retransmitted\_threshold} = \quad (2)$$
$$\text{Input\_pkt\_retx\_threshold} * \text{alpha}$$

where,

Number_of_packets_retransmitted_threshold =
 dynamically adapted threshold for monitoring
 number of retransmitted packets due to duplicate
  acknowledgement reception or re-transmission timeout;

Input_pkt_retx_threshold = value of the hop
  length threshold provided by SCSC 400;

Alpha = 1, if network congestion level <= 50%
 = 0.9, if the network congestion level is > 50 and <= 75%
 = 0.8, if the network congestion level is > 75%, Thereafter, at 606, adulteration in communication data is detected in real-time based on comparison of a set of adulteration parameters derived from the communication data with associated dynamically adapted thresholds. At 608, feasibility of correcting the adulterated content is determined based on satisfaction of predefined criteria. Based on satisfaction of the predefined criteria, the adulterated content is selectively corrected at 610. This has been explained in detail in conjunction with FIG. 5.

At 612, additional information associated with the adulterated content is sent to LIG 112. The additional information that is sent to LIG 112 may include, but is not limited to type of adulteration done, whether adulteration was done by target user 102 or peer user 104, and at least one of indication of inability to correct the adulterated content along with the reason and relevant information (for example, confidence level and inability to identify the exact adulterated packet), or indication of adulterated content being corrected along with relevant information (for example, output confidence level and information about packets removed with a lower confidence level).

At 614, feedback regarding the adulteration that has been detected at 606 is sent to SCSC 400. This enables SCSC 400 to adapt the set of thresholds and the content to be monitored for future sessions between target user 102 and peer user 104, before forwarding the same to SCS 300 and thereon to gateway 200. The feedback may include, but is not limited to number and content of TCP packets which were below the hop length threshold but did not involve a retransmission, number and content of packets which contained abnormal header contents but did not involve a retransmission, number and content of TCP packets which were above the hop length threshold by a certain number, but involved retransmission with different contents each time.

Thereafter, at 616, aggregated content is sent to LIG 112. The aggregated content includes corrected packets after suitable formatting and sequencing has been performed. Additionally, more information is sent to LIG 112 based on confidence level of identification of unwanted packets. This is further explained in conjunction with FIGS. 7A and 7B. This information enables further processing by LIG 112, which further helps LEA 108 to reach appropriate conclusions and define appropriate future course of actions.

Figure 7A:
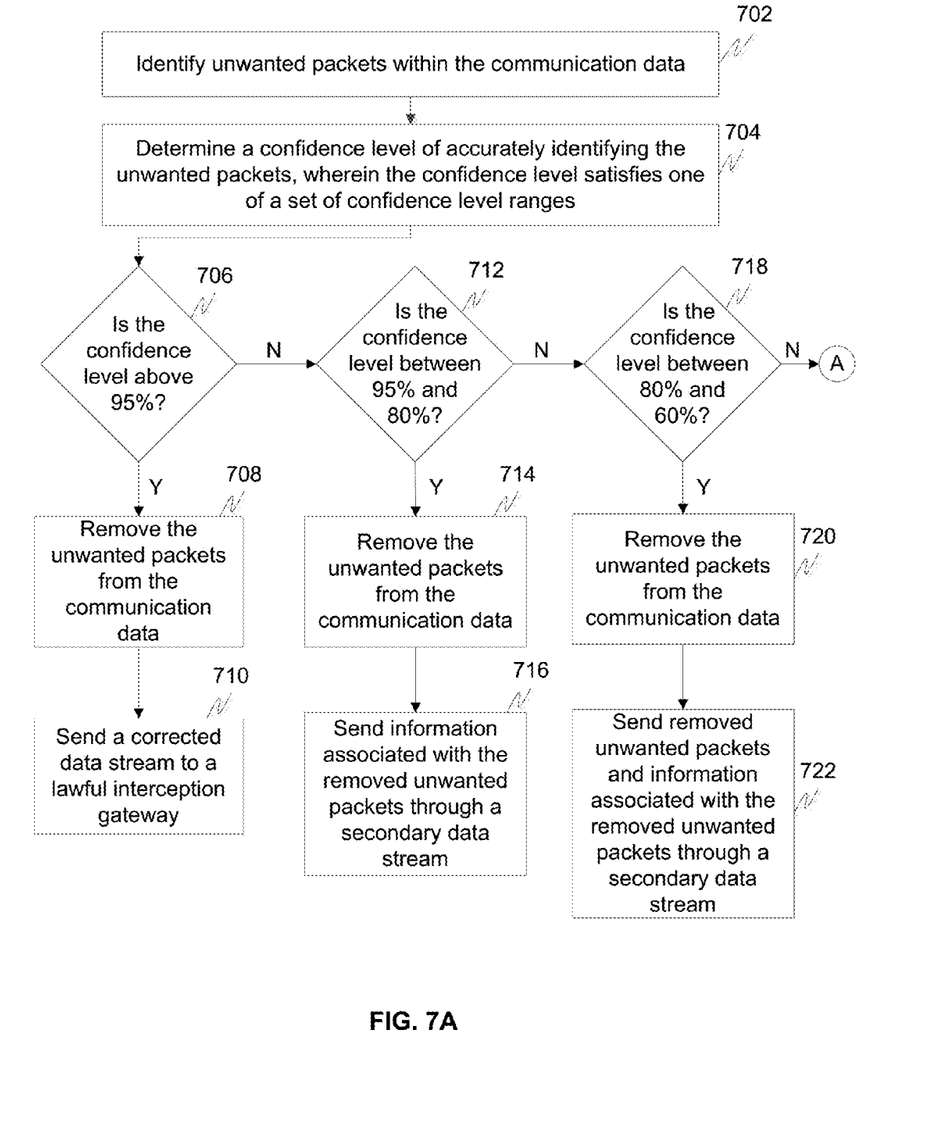
FIGS. 7A and 7B illustrate a flow chart of a method for correcting adulterated content, in accordance with an embodiment.
Figure 7B:
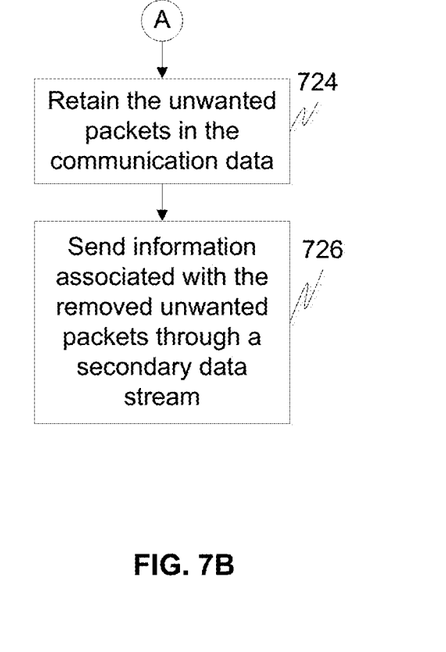

Referring now to FIGS. 7A and 7B, a flow chart of a method for correcting adulterated content is illustrated, in accordance with an embodiment. After detection of adulteration in the communication data, in order to attempt to correct the adulteration, unwanted packets within the communication data are identified at 702. These unwanted packets are the cause of adulteration in the communication data and include garbage or misleading content. Thereafter, at 704, a confidence level of accurately identifying the unwanted packets is determined. There are a set of confidence level ranges, such that, the confidence level satisfies one of these confidence level ranges. A confidence level represents the probability of identifying the packet correctly as being unwanted. The probability, for example, may be computed based on the match between the packet and its acknowledgement. The set of confidence level ranges as indicated above may be provisioned by LEA 108. At 706, a check is performed to determine whether the confidence level is above 95 percent. If the confidence level is above 95 percent, the unwanted packets are removed from the communication data at 708. Thereafter, at 710, a corrected data stream is sent to LIG 112.

Referring back to 706, if the confidence level is below or equal to 95 percent, a check is performed at 712 to determine if the confidence level is between 95 and 80 percent. If the confidence level is between 95 and 80 percent, then at 714 the unwanted packets are removed from the communication data. Thereafter, information associated with the removed unwanted packets is also sent through a secondary data stream to LIG 112 at 716.

Referring back to 712, if the confidence level is below 80 percent, a check is performed at 718 to determine if the confidence level is 60 percent or higher and below 80 percent. If the confidence level is 60 percent or higher and below 80 percent, the unwanted packets are removed from the communication data at 720. Thereafter, removed unwanted packets are sent along with information associated with the removed unwanted packets through a secondary data stream to LIG 112 at 722.

Referring back to 718, if the confidence level is below 60 percent, the unwanted packets in the communication data are retained at 724, instead of being removed. Thereafter, at 726, information associated with the removed unwanted packets is sent through a secondary data stream to LIG 112. In all above scenarios, confidence level of identification is also sent to LIG 112, in order to aid further processing by LIG 112.

Figure 8:
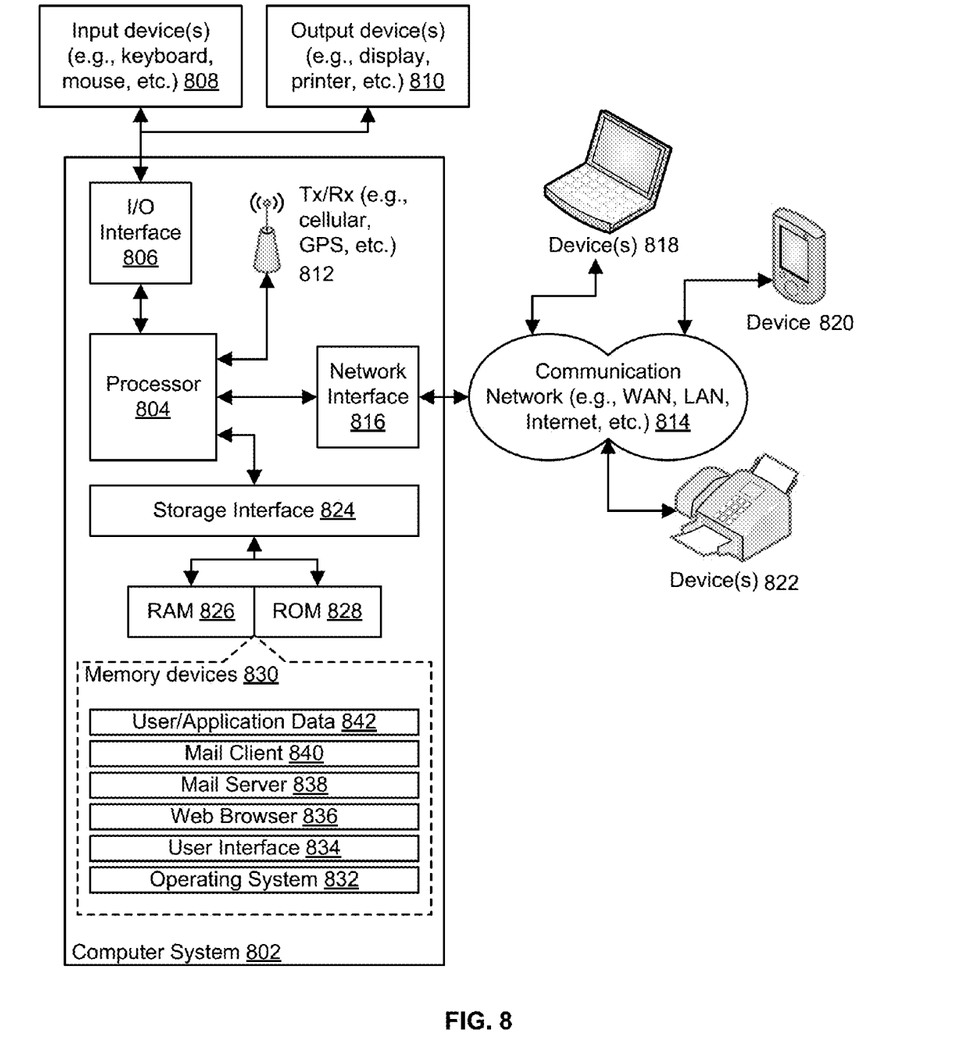
FIG. 8 illustrates a block diagram of an exemplary computer system for implementing various embodiments.

FIG. 8 is a block diagram of an exemplary computer system for implementing various embodiments. Computer system 802 may comprise a central processing unit ("CPU" or "processor") 804. Processor 804 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 804 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 804 may be disposed in communication with one or more input/output (I/O) devices via an I/O interface 806. I/O interface 806 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 806, computer system 802 may communicate with one or more I/O devices. For example, an input device 808 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 810 may be a printer, fax machine, video display (e.g., cathode ray tube (CRT), liquid crystal display (LCD), light-emitting diode (LED), plasma, or the like), audio speaker, etc. In some embodiments, a transceiver 812 may be disposed in connection with processor 804. Transceiver 812 may facilitate various types of wireless transmission or reception. For example, transceiver 812 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 804 may be disposed in communication with a communication network 814 via a network interface 816. Network interface 816 may communicate with communication network 814. Network interface 816 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 814 may include, without limitation, a direct interconnection, local area network (LAN), wide area network (WAN), wireless network (e.g., using Wireless Application Protocol), the Internet, etc. Using network interface 816 and communication network 814, computer system 802 may communicate with devices 818, 820, and 822. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 802 may itself embody one or more of these devices.

In some embodiments, processor 804 may be disposed in communication with one or more memory devices (e.g., RAM 826, ROM 828, etc.) via a storage interface 824. Storage interface 824 may connect to memory devices 830 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 830 may store a collection of program or database components, including, without limitation, an operating system 832, a user interface application 834, a web browser 836, a mail server 838, a mail client 840, a user/application data 842 (e.g., any data variables or data records discussed in this disclosure), etc. Operating system 832 may facilitate resource management and operation of the computer system 802. Examples of operating system 832 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 834 may facilitate display, execution, interaction, manipulation, or operation of program components through textual or graphical facilities. For example, user interfaces may provide computer interaction interface elements on a display system operatively connected to computer system 802, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 802 may implement web browser 836 stored program component. Web browser 836 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 802 may implement mail server 838 stored program component. Mail server 838 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 802 may implement mail client 840 stored program component. Mail client 840 may be a mail viewing application, such as Apple Mail, Microsoft Entourage, Microsoft Outlook, Mozilla Thunderbird, etc.

In some embodiments, computer system 802 may store user/application data 842, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the technology with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described methods and systems for performing lawful interception in a communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for performing lawful interception in a communication network, the method comprising:
    detecting in real-time, by at least one network device, adulteration in communication data based on a comparison of a set of adulteration parameters derived from the communication data with associated thresholds within a set of thresholds;
    analyzing, by the at least one network device, adulterated content in the communication data to determine feasibility of correcting the adulterated content based on satisfaction of predefined criteria; and
    selectively correcting, by the at least one network device, the adulterated content based on satisfaction of the predefined criteria.

2. The method of claim 1 further comprising:
    monitoring, by the at least one network device, a set of network parameters to detect a change in one or more of the set of network parameters, wherein one or more of the set of network parameters comprise network congestion, network choke, packet queuing, buffer overflows, insufficient network coverage, link unavailability, network delays, packet drops, or users involved in session for the communication data; and
    dynamically adapting, by the at least one network device and in real time, one or more of the set of thresholds in response to detecting a change in one or more of the set of network parameters.

3. The method of claim 1, wherein one or more of the set of adulteration parameters comprise packets with insufficient hop length, packets with unused protocol headers filled in, packets with invalid, not used, or intentionally misleading Real-time Transport Protocol (RTP) header contents, interval between retransmission of a same packet, packets with difference in content between the initially sent and one or more retransmitted versions of a same packet, packets with unacceptable protocol or packet header values, port changes, RST and other flag adulterations, packets with insufficient or invalid TTL contents, or packets with content length lower than the minimum possible content length for that packet type or protocol.

4. The method of claim 1, further comprising:
identifying, by the at least one network device, one or more unwanted packets within the communication data;
determining, by the at least one network device, a confidence level of accurately identifying the unwanted packets, wherein the confidence level satisfies one of a set of confidence level ranges; and
removing, by the at least one network device, the unwanted packets from the communication data in response to the identifying.

5. The method of claim 4 further comprising at least one of:
sending, by the at least one network device, a corrected data stream to a lawful interception gateway in response to removing the unwanted packets or one or more of the removed unwanted packets, or information associated with the one or more of the removed unwanted packets, based on a confidence level range that the confidence level satisfies, to a lawful interception gateway and through a secondary data stream; or
retaining, by the at least one network device, the unwanted packets in the communication data in response to the identifying, when the confidence level is within a lowest confidence level range.

6. The method of claim 1 further comprising sending, by the at least one network device, additional information to a lawful interception gateway, the additional information comprising at least one of an entity causing adulteration, means of adulteration, frequency of adulterated packets, which of the adulteration parameter thresholds were crossed, or an indication of at least one of an inability to correct the adulterated content along with the reason or adulterated content being corrected along.

7. The method of claim 1 further comprising:
sending, by the at least one network device, feedback comprising information associated with the identified adulteration to a controller; and
adapting, by the at least one network device, the set of thresholds based on the feedback for one or more future communication sessions.

8. At least one network device comprising a processor and a memory coupled to the processor, wherein the memory stores one or more executable instructions, which when executed by the processor, cause the processor to:
detect in real-time adulteration in communication data based on a comparison of a set of adulteration parameters derived from the communication data with associated thresholds within a set of thresholds;
analyze adulterated content in the communication data to determine feasibility of correcting the adulterated content based on satisfaction of predefined criteria; and
selectively correct the adulterated content based on satisfaction of the predefined criteria.

9. The at least one network device of claim 8, wherein the memory further stores one or more executable instructions, which when executed by the processor, further cause the processor to:
monitor a set of network parameters to detect a change in one or more of the set of network parameters, wherein one or more of the set of network parameters comprise network congestion, network choke, packet queuing, buffer overflows, insufficient network coverage, link unavailability, network delays, packet drops, or users involved in session for the communication data; and
dynamically adapt, in real time, one or more of the set of thresholds in response to detecting a change in one or more of the set of network parameters.

10. The at least one network device of claim 8, wherein one or more of the set of adulteration parameters comprise packets with insufficient hop length, packets with unused protocol headers filled in, packets with invalid, not used, or intentionally misleading Real-time Transport Protocol (RTP) header contents, interval between retransmission of a same packet, packets with difference in content between the initially sent and one or more retransmitted versions of a same packet, packets with unacceptable protocol or packet header values, port changes, RST and other flag adulterations, packets with insufficient or invalid TTL contents, or packets with content length lower than the minimum possible content length for that packet type or protocol.

11. The at least one network device of claim 8, wherein the memory further stores one or more executable instructions, which when executed by the processor, further cause the processor to:
identify one or more unwanted packets within the communication data;
determine a confidence level of accurately identifying the unwanted packets, wherein the confidence level satisfies one of a set of confidence level ranges; and
remove the unwanted packets from the communication data in response to the identifying.

12. The at least one network device of claim 11, wherein the memory further stores one or more executable instructions, which when executed by the processor, further cause the processor to at least one of:
send a corrected data stream to a lawful interception gateway in response to removing the unwanted packets or one or more of the removed unwanted packets, or information associated with the one or more of the removed unwanted packets, based on a confidence level range that the confidence level satisfies, to a lawful interception gateway and through a secondary data stream; or
retain the unwanted packets in the communication data in response to the identifying, when the confidence level is within a lowest confidence level range.

13. The at least one network device of claim 8, wherein the memory further stores one or more executable instructions, which when executed by the processor, further cause the processor to send additional information to a lawful interception gateway, the additional information comprising at least one of an entity causing adulteration, means of adulteration, frequency of adulterated packets, which of the adulteration parameter thresholds were crossed, or an indication of at least one of an inability to correct the adulterated content along with the reason or adulterated content being corrected along.

14. The at least one network device of claim 8, wherein the memory further stores one or more executable instructions, which when executed by the processor, further cause the processor to:
send feedback comprising information associated with the identified adulteration to a controller; and
adapt the set of thresholds based on the feedback for one or more future communication sessions.

15. A non-transitory computer readable medium comprising instructions stored thereon for facilitating lawful interception in a communication network, which when executed by at least one processor, cause the processor to perform steps comprising:

detecting in real-time adulteration in communication data based on a comparison of a set of adulteration parameters derived from the communication data with associated thresholds within a set of thresholds;

analyzing adulterated content in the communication data to determine feasibility of correcting the adulterated content based on satisfaction of predefined criteria; and     selectively correcting the adulterated content based on satisfaction of the predefined criteria.

16. The non-transitory computer readable medium as claimed in claim 15, further comprising one or more additional instructions, which when executed by the at least one processor, further cause the processor to perform one or more additional steps comprising:

monitoring a set of network parameters to detect a change in one or more of the set of network parameters, wherein one or more of the set of network parameters comprise network congestion, network choke, packet queuing, buffer overflows, insufficient network coverage, link unavailability, network delays, packet drops, or users involved in session for the communication data; and     dynamically adapting, in real time, one or more of the set of thresholds in response to detecting a change in one or more of the set of network parameters.

17. The non-transitory computer readable medium as claimed in claim 15, wherein one or more of the set of adulteration parameters comprise packets with insufficient hop length, packets with unused protocol headers filled in, packets with invalid, not used, or intentionally misleading Real-time Transport Protocol (RTP) header contents, interval between retransmission of a same packet, packets with difference in content between the initially sent and one or more retransmitted versions of a same packet, packets with unacceptable protocol or packet header values, port changes, RST and other flag adulterations, packets with insufficient or invalid TTL contents, or packets with content length lower than the minimum possible content length for that packet type or protocol.

18. The non-transitory computer readable medium as claimed in claim 15, further comprising one or more additional instructions, which when executed by the at least one processor, further cause the processor to perform one or more additional steps comprising:

identifying one or more unwanted packets within the communication data;

determining a confidence level of accurately identifying the unwanted packets, wherein the confidence level satisfies one of a set of confidence level ranges; and     removing the unwanted packets from the communication data in response to the identifying.

19. The non-transitory computer readable medium as claimed in claim 18, further comprising one or more additional instructions, which when executed by the at least one processor, further cause the processor to perform one or more additional steps comprising at least one of:

sending a corrected data stream to a lawful interception gateway in response to removing the unwanted packets or one or more of the removed unwanted packets, or information associated with the one or more of the removed unwanted packets, based on a confidence level range that the confidence level satisfies, to a lawful interception gateway and through a secondary data stream; or     retaining the unwanted packets in the communication data in response to the identifying, when the confidence level is within a lowest confidence level range.

20. The non-transitory computer readable medium as claimed in claim 15, further comprising one or more additional instructions, which when executed by the at least one processor, further cause the processor to perform one or more additional steps comprising sending additional information to a lawful interception gateway, the additional information comprising at least one of an entity causing adulteration, means of adulteration, frequency of adulterated packets, which of the adulteration parameter thresholds were crossed, or an indication of at least one of an inability to correct the adulterated content along with the reason or adulterated content being corrected along.

21. The non-transitory computer readable medium as claimed in claim 15, further comprising one or more additional instructions, which when executed by the at least one processor, further cause the processor to perform one or more additional steps comprising:

sending feedback comprising information associated with the identified adulteration to a controller; and     adapting the set of thresholds based on the feedback for one or more future communication sessions.

\* \* \* \* \*